US012722756B2

(12) United States Patent
Dyhrberg

(10) Patent No.: US 12,722,756 B2
(45) Date of Patent: Sep. 1, 2026

(54) CLEANING HEAD FOR A MARINE CLEANING SYSTEM

(71) Applicant: FRANMARINE UNDERWATER SERVICES PTY LTD, Henderson (AU)

(72) Inventor: Roger Wayne Richard Dyhrberg, North Fremantle (AU)

(73) Assignee: FRANMARINE UNDERWATER SERVICES PTY LTD, Henderson (AU)

( * ) Notice: Subject to any disclaimer, the term of this patent is extended or adjusted under 35 U.S.C. 154(b) by 358 days.

(21) Appl. No.: 18/282,020

(22) PCT Filed: Mar. 14, 2022

(86) PCT No.: PCT/AU2022/050214
§ 371 (c)(1),
(2) Date: Sep. 14, 2023

(87) PCT Pub. No.: WO2022/192938
PCT Pub. Date: Sep. 22, 2022

(65) Prior Publication Data

US 2024/0166316 A1 May 23, 2024

(30) Foreign Application Priority Data

Mar. 15, 2021 (AU) ................................ 2021900746

(51) Int. Cl.
*B63B 59/08* (2006.01)
*B08B 1/16* (2024.01)
(Continued)

(52) U.S. Cl.
CPC .............. *B63B 59/08* (2013.01); *B08B 1/165* (2024.01); *B08B 1/36* (2024.01); *B08B 5/04* (2013.01);
(Continued)

(58) Field of Classification Search
CPC .............. B63B 59/08; B63B 2059/085; B63B 2059/087; B63B 2059/082; B63B 59/06;
(Continued)

(56) References Cited

U.S. PATENT DOCUMENTS 2,879,530 A * 3/1959 Ego .................... A47L 11/4094 15/245.1
2,893,046 A * 7/1959 Thompson ................ A47L 9/02 15/325
(Continued)

FOREIGN PATENT DOCUMENTS

CN 210391512 4/2020
EP 0131987 1/1985
(Continued)

OTHER PUBLICATIONS

International Search Report for PCT/AU2022/050214 dated Apr. 13, 2022.
Written Opinion for PCT/AU2022/050214 dated Apr. 13, 2022.

*Primary Examiner* — Joshua E Freeman
(74) *Attorney, Agent, or Firm* — Ralph E. Jocke; WALKER & JOCKE

(57) ABSTRACT

A cleaning head for a marine cleaning system used for cleaning a liquid submerged surface includes a body configured to be disposed adjacent to and moved relative to the submerged surface during use. The body defines at least one suction aperture being in fluid communication with a suction region adjacent the body. At least one support arm extends from the body, which support arm in turn supports a respective cleaning element including a scraping blade that is configured to cause material on the submerged surface to separate from the submerged surface and become suspended in the suction region during use. The material separated from the submerged surface is drawn away from the suction region through the at least one suction aperture. Each
(Continued)

support arm extends flexibly from a respective junction with the body so that the cleaning element is supported in a spaced relation laterally away from the junction with the junction being disposed in an operatively forward direction of the cleaning element during use.

30 Claims, 6 Drawing Sheets

(51) Int. Cl.
*B08B 1/36* (2024.01)
*B08B 5/04* (2006.01)
*B08B 15/04* (2006.01)

(52) U.S. Cl.
CPC ........ *B08B 15/04* (2013.01); *B63B 2059/085* (2013.01)

(58) Field of Classification Search
CPC .. B08B 1/165; B08B 1/36; B08B 5/04; B08B 15/04
See application file for complete search history.

(56) References Cited

U.S. PATENT DOCUMENTS 3,628,489 A * 12/1971 Michaelsen ............. B63B 59/08 15/4
4,279,212 A 7/1981 Hundberg
4,682,558 A * 7/1987 Broersz ..................... B08B 1/36 15/49.1
5,297,363 A * 3/1994 Schroder ................. B63B 59/06 451/354
6,467,124 B1 * 10/2002 Small .................. A47L 11/4044 15/322
6,601,266 B1 * 8/2003 Faraci ................. A47L 11/4075 15/246.2
7,527,696 B1 * 5/2009 Aus ......................... B08B 1/165 15/93.1
7,805,805 B2 * 10/2010 Loveless ............... A47L 9/0673 15/246.2
8,794,251 B2 * 8/2014 Ostervold ............... B63B 59/10 15/322
9,505,472 B2 * 11/2016 Kalliomäki ............. B63B 59/08
9,550,552 B2 * 1/2017 Dyhrberg ................ B63B 59/08
10,124,867 B2 * 11/2018 Smith ....................... B08B 1/36
11,089,934 B2 * 8/2021 Evans ..................... B08B 1/165
11,433,437 B2 * 9/2022 Pierson ..................... A47L 9/02
2003/0171079 A1 * 9/2003 How ....................... B24B 55/10 451/344
2008/0109986 A1 * 5/2008 Loveless ............... A47L 9/0673 15/401
2012/0006244 A1 * 1/2012 Van Rompay .......... B63B 59/10 114/222
2013/0206172 A1 * 8/2013 Bjar .......................... B08B 7/04 134/6
2014/0237740 A1 * 8/2014 Kauffman ................. B08B 1/10 15/104.001
2016/0207597 A1 * 7/2016 Dyhrberg ................ B63B 59/08
2016/0270612 A1 * 9/2016 Witter ..................... A47L 7/009
2016/0288175 A1 * 10/2016 Therkildsen .............. B05B 3/06
2019/0039103 A1 * 2/2019 Morris, Sr. ......... A47L 11/4044
2019/0248454 A1 * 8/2019 Dyhrberg .................. B08B 1/30
2021/0114896 A1 * 4/2021 Kalliomäki ............... B08B 1/36
2021/0371062 A1 * 12/2021 Dyhrberg .............. G06T 1/0007
2024/0059383 A1 * 2/2024 Ligeiro Barbosa ..... B63B 59/08

FOREIGN PATENT DOCUMENTS

GB 1340816 12/1973
WO 2016033678 3/2016

* cited by examiner

CLEANING HEAD FOR A MARINE CLEANING SYSTEM

TECHNICAL FIELD

The present disclosure relates to a cleaning head for a marine cleaning system. More particularly, the present disclosure relates to a cleaning head for connection to a marine cleaning system used for cleaning a submerged surface, for example to clean an underwater portion of a ship hull or other structure, such as a dock pier or piling.

BACKGROUND

When a structure is submerged underwater for extended lengthy periods, and especially in sea water, it is common for the structure to become covered by plant and animal growth, e.g. seaweed and various types of barnacles. In many cases, this growth can remain undisturbed. However, in the case of ship hulls, the growth constitutes biological fouling and is detrimental in various aspects. Significant problems can occur if the fouling is not removed from the ship hull, including damage to the hull itself or to the antifouling coating thereon and potentially causing a reduction in the ship's seafaring performance and increased fuel consumption.

Antifouling coatings are applied to a vessel hull as the primary defense against biological fouling. Silicon based coatings are generally used on high-speed vessels and on infrequently stopping vessels, e.g. military navy vessels, which compound inherently minimizes any biological fouling. In slow-speed vessels, such as container ships, the antifouling coating includes an active ingredient or pesticide, such as tin, zinc or copper oxides, to minimize adhesion by the biological fouling. It will be appreciated that applying such antifouling coatings to large vessels is generally commercially expensive to apply and to repair if damaged.

Antifouling coatings containing copper oxide can experience leaching during its underwater lifespan, resulting in the leached layer becoming relatively loosely attached to the antifouling coating. Over time the leached layer becomes increasingly less active and progressively higher amounts of biological fouling can adhere to the coating.

In addition, some living organisms can be noxious and, if transported to other locations while the ship traverses the world's oceans between various ports, can be dangerous to local species. These problems can be reduced or avoided by cleaning the ship hull to remove the biofouling. In many cases, the cleaning of a ship hull is performed in a dry-dock to prevent polluting the environment, but this approach is often expensive and time consuming.

Uncontrolled in-water cleaning may release cleaning chemicals or biological contaminants polluting the local sea water. For example, some submerged cleaning and maintenance platforms (SCAMPs) utilize an integrated impeller to destroy the biological fouling and any harmful invasive marine species therein. However, in additional to the biological fouling, the cleaning residue can also include bits of hull coatings and corrosion by-products, all of which is then simply discharged directly into the surrounding sea water. As mentioned above, most antifouling coatings include heavy metals such as Cu and Zn as biocides that are then released during cleaning operations at levels that can exceed water quality criteria, e.g. if the loosely adhered leached layers of the antifouling coatings are scraped off from the hull. Additionally, the removal of the fouling may stimulate the plant or animal growths to release reproductive propagules, or plant and animal fragments capable of further growth or regeneration.

It is therefore preferable to first filter the cleaning water and fouling residue before discharge to the environment. An example of such a system is disclosed in U.S. Pat. No. 9,550,552 the disclosure of which is incorporated herein by reference in its entirety. In this arrangement a cleaning head has a body, and a skirt extending around a periphery of the body, whereby the skirt functions to seal the body to the ship hull and define a cleaning chamber. The cleaning head also includes a scraper for dislodging the fouling from the hull inside the cleaning chamber, and at least one suction pipe in fluid communication with the cleaning chamber. During use the dislodged fouling is water-borne and drawn away from the cleaning head through the suction pipe to a filtration unit (which may be surface mounted) before the cleaned sea water is returned to the environment.

The above prior art systems are relatively large platforms/vehicles that cannot always be directed into tight corners or hard-to-reach areas, e.g. around the ship's propellers. They also cannot be effectively used to clean smaller areas, e.g. smaller boat hulls or dock piers or pilings. In such cases a hand operated cleaning head is often more useful.

It is to be understood that, if any prior art publication is referred to herein, such reference does not constitute an admission that the publication forms a part of the common general knowledge in the relevant art.

SUMMARY OF THE DISCLOSURE

According to an exemplary arrangement, there is provided a cleaning head for a marine cleaning system used for cleaning a liquid submerged surface, the cleaning head comprising

- a body being configured to be movable in disposed adjacent relation to and moved relative to a submerged surface;
- at least one suction aperture being in fluid communication with a suction region around the body during use;
- at least one support arm extending from the body, the support arm extending from a junction with the body;
- a cleaning element supported by each support arm, whereby the cleaning element is configured to cause material on the submerged surface to separate from the submerged surface and become suspended in the suction region during use when the body is moved in an operative direction relative to the submerged surface, and whereby the material separated from the submerged surface is drawn away from the suction region through the suction aperture; and
- wherein the cleaning element is spaced laterally away from the junction so that the junction is disposed in an operatively forward direction of the cleaning element during use.

The exemplary body may be substantially tubular with the suction aperture being provided at one end of the body and with an open mouth being provided at an opposed end of the body. The mouth may have a larger cross sectional area than that of the suction aperture so that the body converges from the mouth towards the suction aperture.

The exemplary body comprises a floor that may be inclined relative to the cleaning element so that orientating the floor substantially parallel to the submerged surface during use assists in orientating the cleaning element at a preselected operative cleaning inclination angle. In one exemplary arrangement the body comprises one or more magnets embedded within the floor with the magnets being configured to slidably hold the floor against a ferromagnetic submerged surface.

The exemplary cleaning element may include a scraper body and a scraper blade. The scraper blade may be an integral part of the scraper body. Alternatively, the scraper blade may be a separate part and releasably joined to the scraper.

The exemplary cleaning element may have a flat planar shape.

In some exemplary arrangements the cleaning element has an arcuate shape having its concave face directed towards the body. In this arrangement the cleaning element may have an arched shape so that a central part of the cleaning element is raised above the opposed outer parts of the cleaning element.

The exemplary cleaning element may have a transverse width being substantially wider than the transverse width of the body, whereby the cleaning element defines opposed wings that project laterally beyond the body.

The exemplary cleaning head may include opposed channels provided between the cleaning element and the body on opposed sides of the body, the channels being configured to allow liquid flow from a suction region around the cleaning head towards the suction aperture. The exemplary channels may define a venturi type constriction being configured in use to cause an increased flow rate of liquid from the suction region into the suction aperture. The exemplary cleaning element may be movably supported relative to the body thereby permitting adjustment of a cross sectional area of the channels.

In some exemplary arrangements, the body may comprise a rotatable disc and the suction aperture may comprise one or more apertures extending transversely through the disc. The exemplary cleaning head may comprise a number of cleaning elements arranged at discrete spaced circumferential intervals on the body.

In some exemplary arrangements the support arm is flexibly attached to the body to allow movement of the cleaning element closer to or further away from the body. The exemplary cleaning head may include a biasing member configured to bias the support arm and cleaning element away from the body. The biasing member may be a spring, resilient plastics material or resilient foam material, for example.

The exemplary cleaning element may be angled towards the junction so that, during use, the cleaning element is operatively aligned relative to the submerged surface at a preselected operative cleaning inclination angle. In some examples the inclination angle is 130°-140°. In an exemplary arrangement the inclination angle is 135°.

The exemplary arrangement may be utilized to carry out a method of cleaning a liquid submerged surface, the method comprising

- providing a cleaning head having
  - a body;
  - at least one support arm extending from the body, the support arm extending from a junction with the body; and
  - a cleaning element supported by each support arm, wherein the cleaning element is spaced laterally away from the junction so that the junction is disposed operatively forward of the cleaning element;
- locating the cleaning head against the submerged surface so that the body is disposed adjacent to and movable relative to the submerged surface;
- applying a suction force to a suction region around the body; and
- moving the cleaning head in an operatively forward direction relative to the submerged surface so that the cleaning element causes material on the submerged surface to separate from the submerged surface and become suspended in the suction region,
- whereby the material separated from the submerged surface is drawn away from the suction region through the suction aperture.

BRIEF DESCRIPTION OF DRAWINGS

The above and other features will become more apparent from the following description and with reference to the accompanying schematic drawings. In the drawings, which are given for purpose of illustration only and are not intended to be in any way limiting.

DETAILED DESCRIPTION

Figure 1:
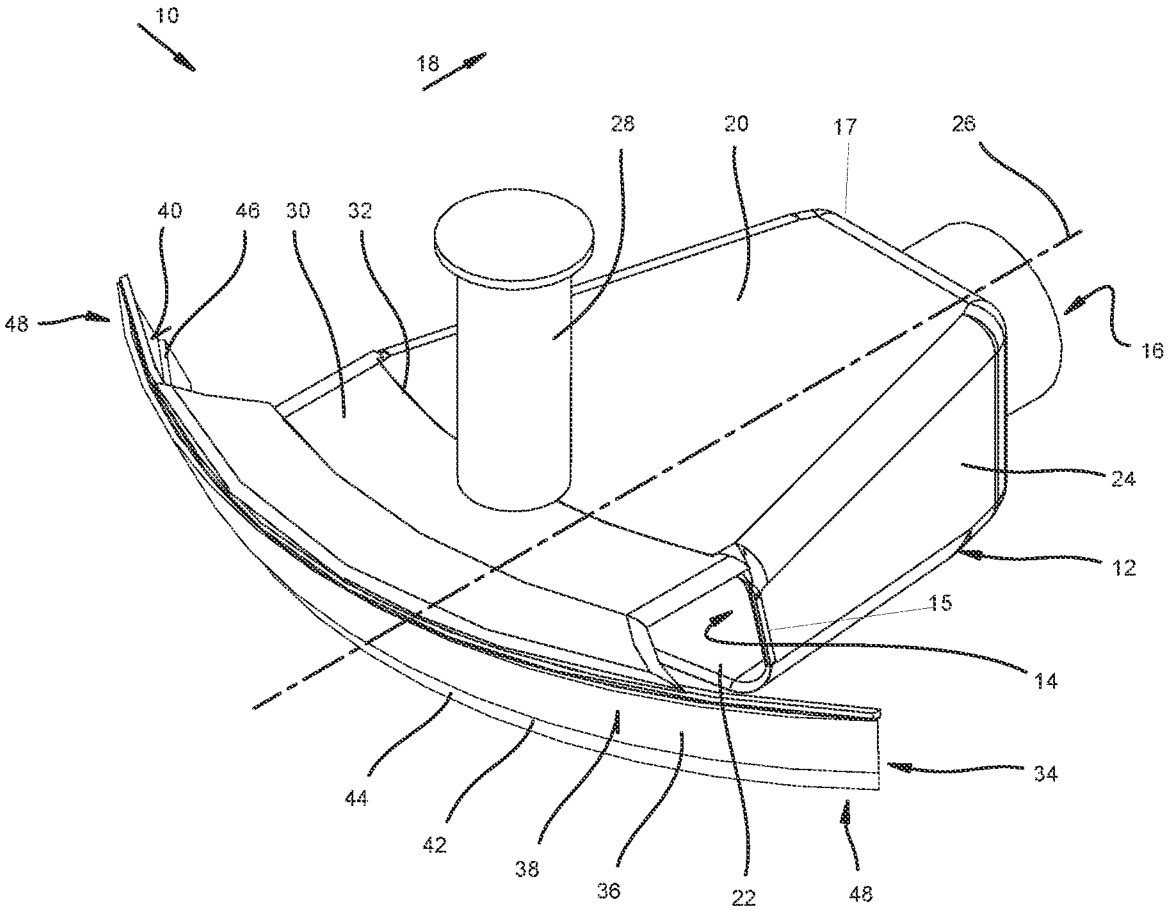
FIG. 1 is a front perspective view of an exemplary arrangement of a cleaning head for a marine cleaning system that is configured for manual use.

The present disclosure relates to a cleaning head 10 configured for connection to a marine cleaning system used for cleaning a submerged surface surrounded by liquid, for example for cleaning an underwater portion of a ship hull or other structure, such as a dock pier or piling. Although the present exemplary arrangement will be described in relation to cleaning a ship hull, it should be understood that other applications are envisaged.

FIGS. 1 to 4 show one exemplary arrangement of the cleaning head 10. The cleaning head 10 includes a substantially tubular body 12. As used herein substantially tubular means extending around a body bounded interior area. An interior area 13 bounded by the tubular body 12 has an open mouth 14 at one body end 15 thereof, and has a suction aperture 16 at an opposed body end 17 thereof. The suction aperture 16 is configured to be joined to a suitable suction pipe (not shown) and therefore in some arrangements may have the shape of a cylindrical spout to which the suction pipe can be clamped.

The body 12 is configured to be disposed adjacent to and moved in an operatively forward direction relative to the submerged surface during use. As used herein the operatively forward direction refers to the direction in which the body is moved relative to the submerged surface to cause material to be scraped off the submerged surface.

The operatively forward direction of body 12 is indicated by arrow 18 wherein the body 12 is moved relative to the surface in a direction from the mouth 14 towards the suction aperture 16.

Figure 2:
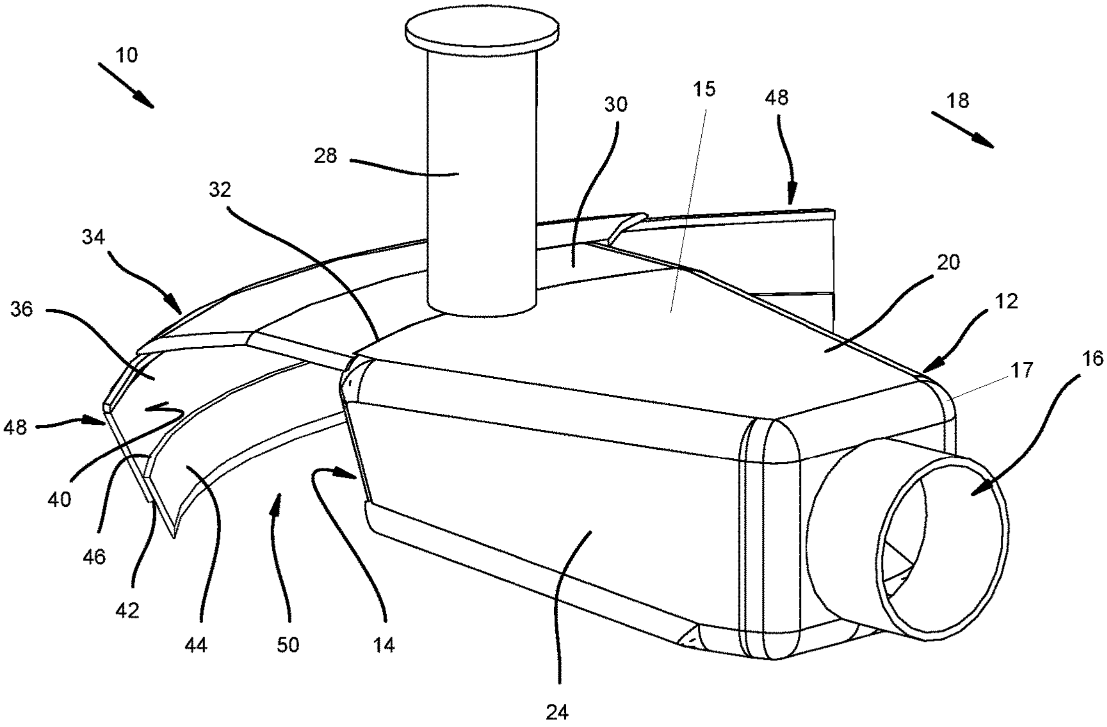
FIG. 2 is a rear perspective view of the cleaning head shown in FIG. 1.
Figure 3:
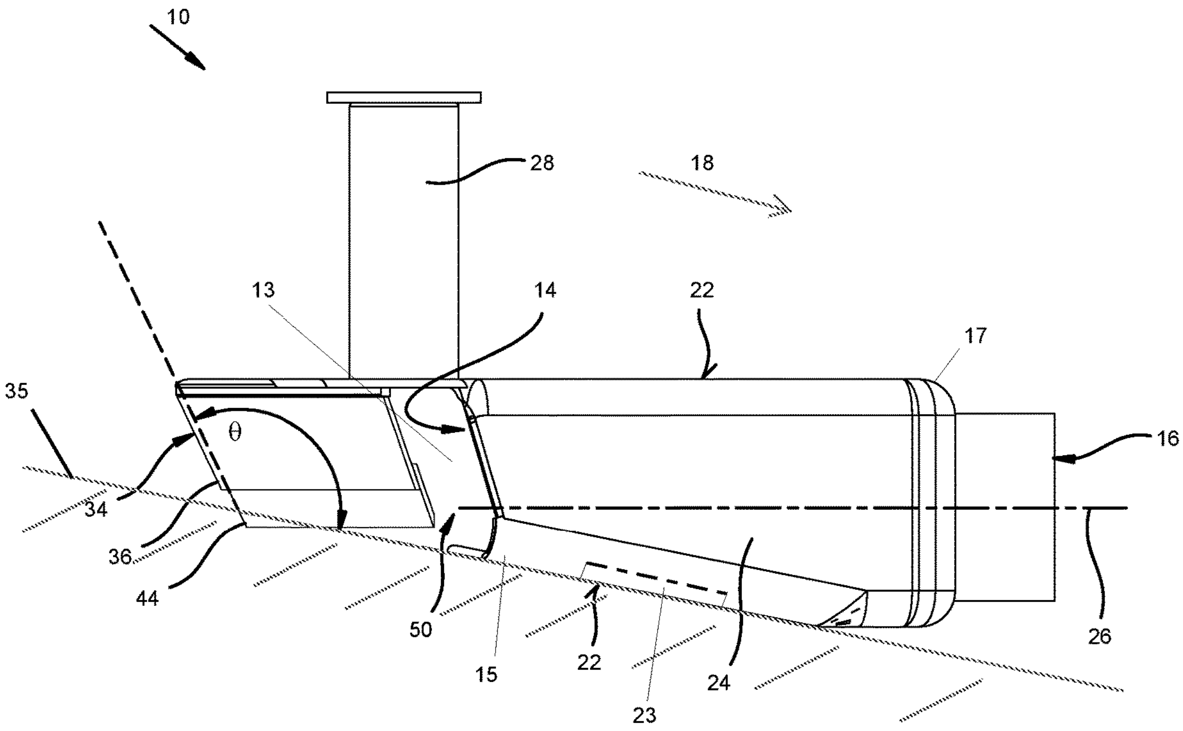
FIG. 3 is a side view of the cleaning head shown in FIG. 1.

It should be understood for the purposes of the description below that the terms "forward" and "rearward" refer to operative direction of movement. Thus "forward" is used herein to refer to a feature or part of the cleaning head 10 that is closest or proximal to the suction aperture 16 or to a position towards the right of the cleaning head 10 as shown in FIGS. 1 to 3. Conversely, "rearward" is used herein to refer to a feature or part of the cleaning head 10 that is furthest or distal to the suction aperture 16 or to a position towards the left of the cleaning head 10 as shown in FIGS. 1 to 3.

In the exemplary arrangement the body 12 interior area 13 has a generally quadrilateral cross section having a roof 20 that is joined to a floor 22 that is joined on respective transverse sides by opposed side walls 24.

The exemplary cleaning head 10 has a central axis 26 that will normally extend centrally from the suction aperture 16. The exemplary arrangement of the cleaning head 10 is mirror symmetrical about a symmetry plane extending vertically through the central axis 26, i.e. whereby the symmetry plane extends centrally through the roof 20 and floor 22.

Figure 4:
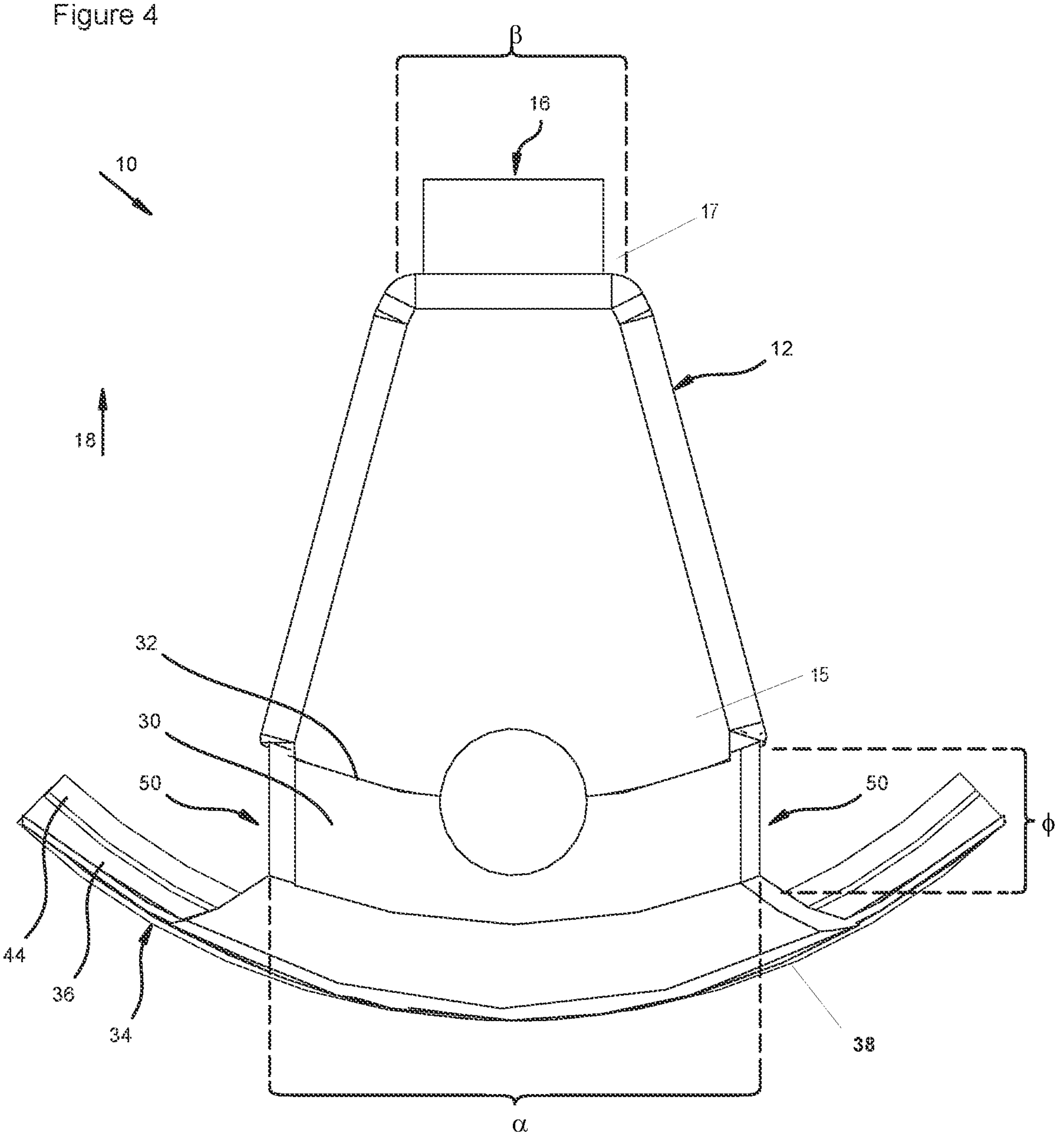
FIG. 4 is a top plan view of the cleaning head shown in FIG. 1.
Figure 5:
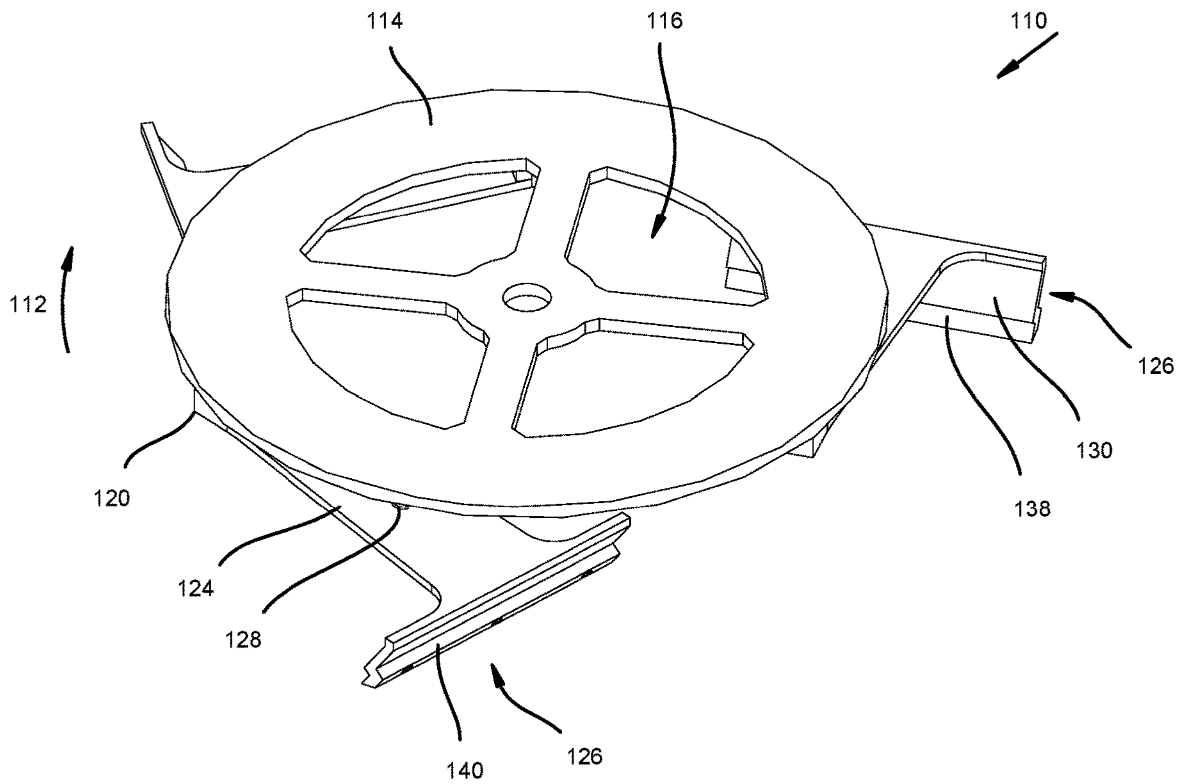
FIG. 5 is an upper perspective view of an alternative exemplary arrangement of a cleaning head for a marine cleaning system that is configured for use in an automated cleaning platform.
Figure 6:
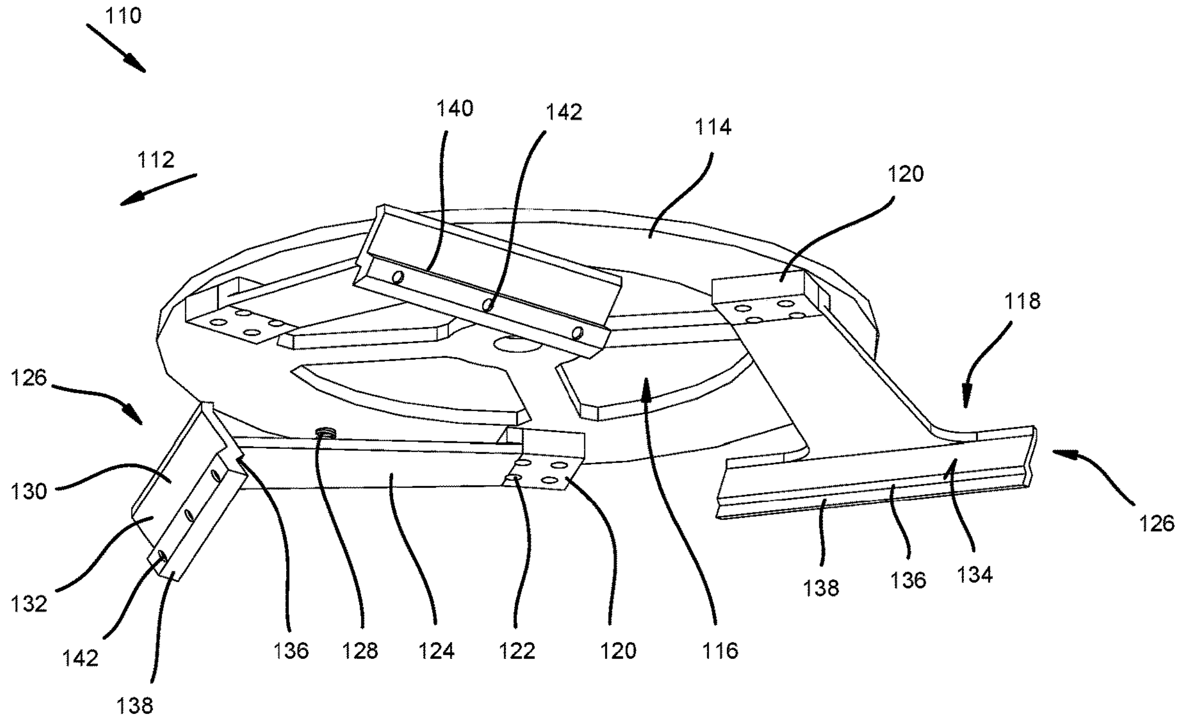
FIG. 6 is a lower perspective view of the cleaning head shown in FIG. 5.
Figure 7:
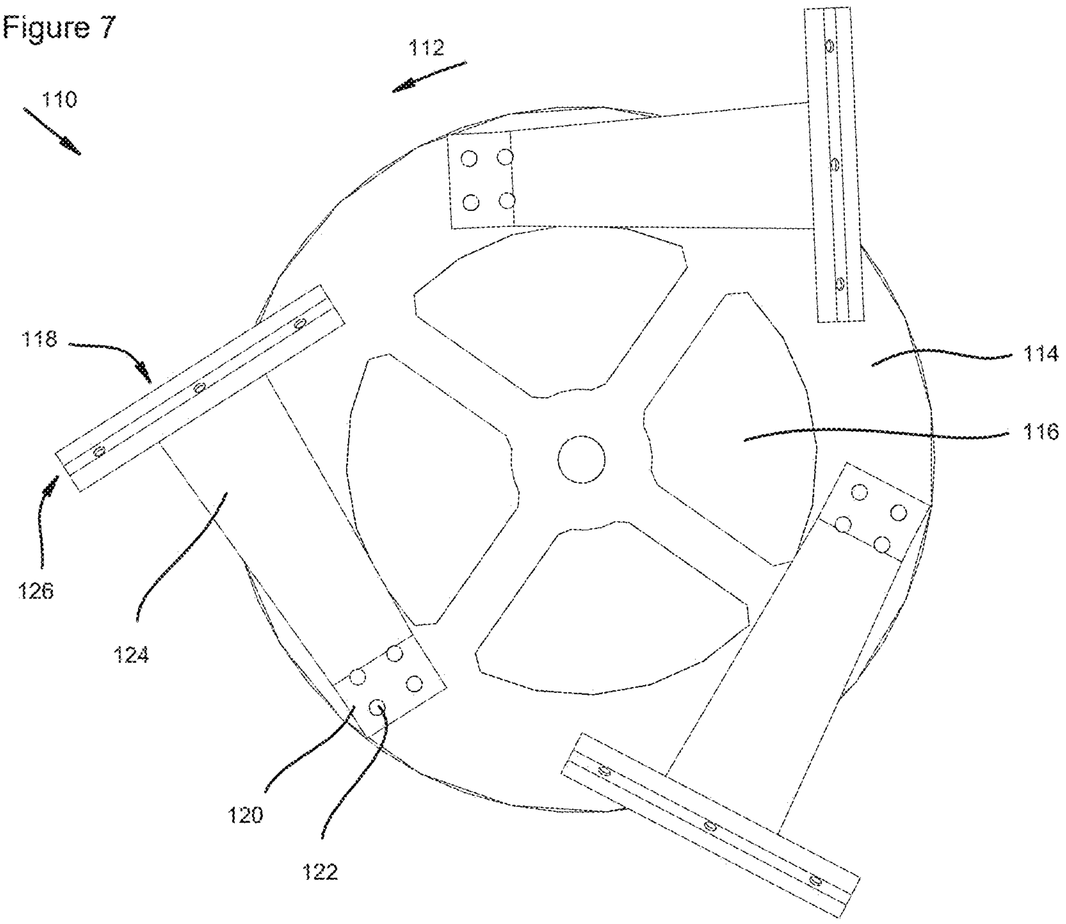
FIG. 7 is a bottom plan view of the cleaning head shown in FIG. 5.

The exemplary body 12 is generally trapezoidal in shape in transverse cross section when seen in plan view so that the roof 20 has a larger transverse dimension $\alpha$ towards the mouth 14 and has a smaller transverse dimension $\beta$ towards the suction aperture 16 (see FIG. 4). Accordingly, the mouth 14 has a larger cross section area than that of the suction aperture 16 so that the interior area of the body is convergent in the exemplary arrangement as body 12 converges from the mouth 14 towards the suction aperture 16.

As can be seen more clearly in FIG. 3, the exemplary roof 20 is orientated substantially parallel relative to the central axis 26, whereas the floor 22 is planar and inclined relative to the central axis 26. The floor 22 is therefore also inclined relative to the roof 20, whereby the floor 22 is located closer to the roof 20 at or near the mouth 14 at the body end 15, while the floor 22 is spaced further away from the roof 20 at or near the suction aperture 16.

The exemplary body 12 includes one or more magnets 23 embedded within the floor 22. In use, and when the submerged surface is ferromagnetic such as is typically found in a ship hull, the magnets are configured to hold the floor 22 against and in substantially parallel slidable engaging contact with the submerged surface.

The exemplary cleaning head 10 includes a maneuvering mount which is alternatively referred to as a maneuvering mounting provided on the body, which maneuvering mounting is configured to allow a maneuvering force to be applied to the body 12. In the exemplary arrangement shown in FIGS. 1 to 4, the maneuvering mounting comprises a manually engageable handle 28 joined to the roof 20 of the body 12. The exemplary handle 28 includes a cylindrical pillar projecting outwardly from the roof 20 that extends transverse to the operatively forward direction. In some alternative arrangements, the handle 28 can project orthogonally from the roof 20. However, it should be appreciated that the exemplary handle 28 functions to allow a user to hold and maneuver the cleaning head 10 and thus the handle 28 can also be provided in other shapes, such as being a spherical knob, an arc-shaped bow handle, or a U-shaped or L-shaped bar handle. In still other examples, the maneuvering mounting can comprise a recess in the body 12, such as one or more finger recesses that can be gripped by the operator's hand.

In the exemplary arrangement a support arm 30 extends from the body 12, whereby the support arm 30 is joined to the roof 20 at a location which is alternatively referred to as a junction 32. The support arm 30 extends axially beyond the floor 22 so that the support arm 30 overhangs the mouth 14. In the exemplary arrangement the support arm 30 is aligned to be co-planar with the roof 20 and in essence forms an integral extension of the roof 20. However, in other exemplary arrangements the support arm 30 may be offset from or angled relative to the roof 20.

In the exemplary arrangement a cleaning element 34 is in fixed operative connection with and depends from the support arm 30 with the cleaning element 34 being spaced laterally away from the junction 32 so that the junction 32 is disposed in the operatively forward direction of the cleaning element 34 during use. The exemplary cleaning element 34 is in a spaced relation laterally rearward of the mouth 14 and is also located rearward of the handle 28. The exemplary cleaning element 34 is angled forwardly/inwardly towards the mouth 14 so that, during use, the cleaning element 34 will be operatively aligned relative to the submerged surface 35 (and accordingly relative to the floor 22) at an angle $\theta$ of 130°-140° (see FIG. 3). In one exemplary arrangement the angle $\theta$ is 135°.

In the exemplary arrangement the cleaning element 34 comprises a scraper body 36 having an outer face 38 facing away from the mouth 14, an inner face 40 facing towards the mouth 14, and a lower edge 42. In some arrangements the scraper body 36 may be integral with the support arm 30. The exemplary scraper body 36 is provided with an integral scraper blade 44 extending along and beyond its lower edge 42. The exemplary scraper blade 44 lies inwardly of the scraper body 36 so that a top edge of the scraper blade 44 defines a ridge 46 extending along the inner face 40. The exemplary ridge 46 acts as a strengthening formation to strengthen the scraper body 36 and mitigate any flexing thereof that may occur during use.

Although in the exemplary arrangement the scraper body 36 and scraper blade 44 are integrally configured, in other arrangements the scraper blade 44 can be separable from the scraper body 36 and releasably joined thereto by suitable fasteners. In some exemplary arrangements, the scraper blade 44 can be bolted to the scraper body 36. In some exemplary arrangements for example, the scraper blade 44 may be configured to be received and frictionally held within a complementary sized slot provided in the scraper body 36. Of course it should be understood that these approaches are exemplary and in other arrangements other types of fastener arrangements may be used.

In the exemplary arrangement the scraper body 36 and the scraper blade 44 have concentric curved or arcuate shapes when seen in plan view, wherein their concave faces are directed towards the body 12. This is more clearly shown in FIGS. 1 and 2. In some exemplary arrangements, the scraper body 36 and the scraper blade 44 can be concentrically spherically shaped.

The exemplary scraper body 36 is spaced rearwardly away from the mouth 14 and depends for a sufficient distance so that the scraper blade 44 lies opposed to the floor 22. In some exemplary arrangements a bottom edge of the scraper blade 44 lies co-planar with the floor 22. The exemplary bottom edge of the scraper blade 44 is sharpened. In the exemplary arrangements in which the scraper blade 44 is arcuate, the scraper blade 44 can also be arched so that a central part of the scraper blade 44 lies above and closer to the roof 20 than the opposed outer parts of the scraper blade 44. Of course it should be understood that these configurations are exemplary.

The exemplary cleaning element 34 has a transverse width substantially wider than the transverse width of the support arm 30 and the body 12 at its mouth 14. As used herein substantially wider means at least 25% wider than the referenced width. The exemplary arrangement shown has the cleaning element 34 about 50% wider than the body 12 at the mouth and the support arm at the location of the junction. In one exemplary arrangement the body 12 has a transverse width at the mouth 14 of about 200 mm while the cleaning element 34 has a transverse width of about 300 mm. The exemplary cleaning element 34 therefore includes laterally opposed outer wings 48 that project laterally transversely beyond the body 12 and the respective support arm 30 on each respective transverse side.

The exemplary cleaning head 10 configuration includes opposed side channels 50 that are located forwardly of the scraper blade and wings 48, and between the cleaning element 34 and the mouth 14. In the exemplary arrangement the channels 50 have a height equivalent to a height of the mouth 14.

In some exemplary arrangements the channels 50 have a width that is adjustable so that the cross sectional area of the channels 50 can be selectively increased or decreased. In such arrangements the cleaning element 34 can be movably mounted in operative connection with the body 12 so that the cleaning element 34 can be moved and held fixed in selected positions axially closer to or further from the body 12, thereby to adjust the width of the channels 50. In some exemplary arrangements the support arm 30 is selectively extendable so that the cleaning element 34 can be moved axially closer to or further from the body 12. In other exemplary arrangements the support arm 30 is telescopic. In other exemplary arrangements the support arm 30 is slidably joined to and supported by the roof 20. In yet further exemplary arrangements the cleaning element 34 is slidably joined to and supported by the support arm 30. After the cleaning element 34 is positioned at the desired distance away from the body 12, i.e. once the desired width of the channel 50 has been set, the support arm 30 and/or cleaning element 34 can be secured in a fixed position to prevent undesired movement thereof during use by suitable fasteners, e.g. by using suitable bolts, clips or split pins, for example.

The exemplary channels 50 are configured to allow liquid flow from a suction region adjacent and around the cleaning head 10 towards the suction aperture 16, whereby in use water and suspended material adjacent to and surrounding the body 12 (being water intermediate of the scraped blade and suction aperture and predominantly water located laterally outside the body 12) is sucked through the channels 50 and the mouth 14 into the body 12 and then through the suction aperture 16. Adjustment of the cross sectional area of the channels 50 allows an operator to maintain an optimum flow rate of liquid flow through the channels 50.

In the exemplary arrangement each of the channels 50 has a cross section dimension $\Phi$ that is smaller than the transverse dimension $\alpha$ of the mouth 14 (see FIG. 4). In some exemplary arrangements the cross section dimension $\Phi$ of the channels 50 is less than half the transverse dimension $\alpha$, so that $\alpha > 2\Phi$. In this way the channels 50 are configured to provide a venturi type constriction being configured to cause an increased velocity and flow rate of water from the outer environment surrounding the body 12 through the channels 50 and into the mouth 14.

Figure 9:
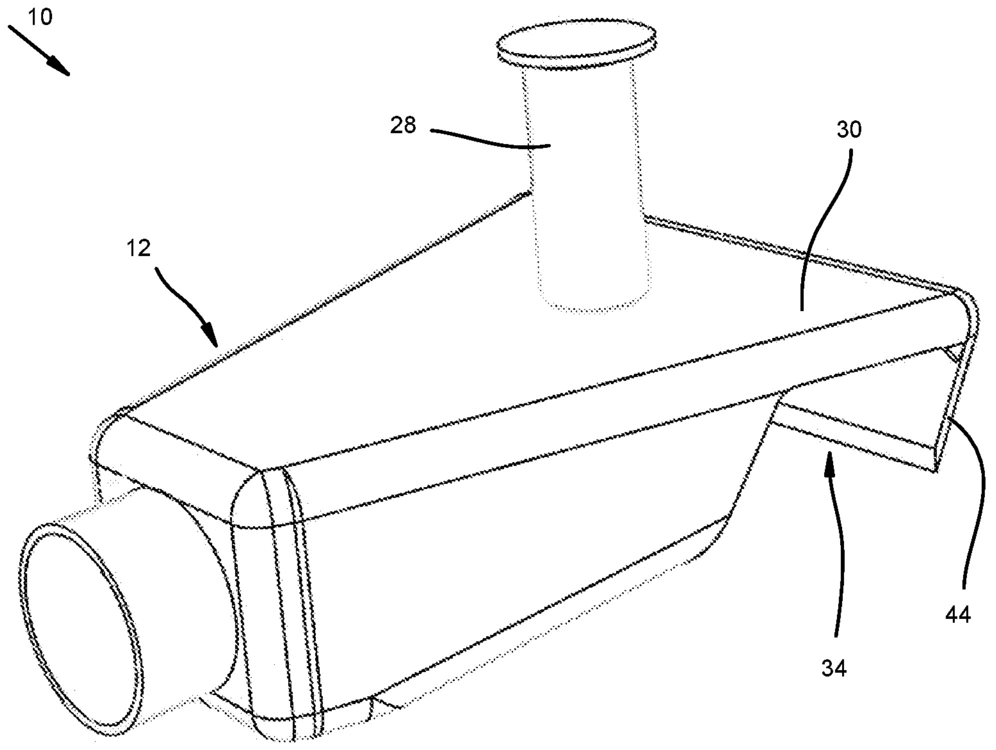
FIG. 9 is a rear perspective view of a further alternative exemplary arrangement of a cleaning head.

In another exemplary arrangement of the cleaning head as shown in FIG. 9, the cleaning element 34 can have a flat planar shape when seen in plan view.

In some exemplary arrangements the cleaning head 10 is an integral single piece that is made of a plastics material or of metal. In some exemplary arrangements the cleaning head 10 can be made of polyurethane or nylon plastics material. In some exemplary arrangements the cleaning head 10 can be made of steel, aluminum or suitable alloys of these metals.

In use, activating the marine cleaning system causes suction through a suction pipe that is connected to the suction aperture 16, resulting in a low pressure within the body 12 which then causes water and suspended material to be sucked into the body 12 through the channels 50 and the mouth 14.

An operator can grip the handle 28 and locate the cleaning head 10 adjacent to a submerged surface of a ship hull or other surface to be cleaned such that the floor 22 lies substantially flush against the submerged surface. The magnets 23 within or otherwise in fixed operative connection with the floor 22 assist in holding the cleaning head 10 against the submerged surface by attraction of ferromagnetic material in the submerged surface and thereby reduces the amount of force pressure needed to maintain the cleaning head 10 in contact with the submerged surface 35. The inclination angle of the floor 22 in the exemplary arrangement is configured to optimally align the scraper blade 44 relative to the submerged surface, e.g. at an inclination angle $\theta$ of from 130° to 140° and in some arrangements 135°.

The operator can then move the cleaning head 10 in forward-rearward directions lying substantially along the central axis 26 to scrape off biological fouling from the submerged surface. It will be appreciated that moving the exemplary cleaning head 10 in an operative forward direction, that is in this exemplary arrangement in a direction of the body from the engaged blade towards the suction aperture 16, constitutes the active removal stroke direction. In contrast, moving the exemplary cleaning head 10 in a rearward direction, that is in a direction from the suction aperture towards the cleaning element 34, constitutes the return stroke direction. This is because of the inclination angle $\theta$ of the scraper blade 44 of the exemplary arrangement.

In conjunction with its inclination angle $\theta$, the sharpened bottom edge of the scraper blade 44 of the exemplary arrangement operates to lift (e.g. slice or peel) the biological fouling away from the hull or other surface over which the cleaning head is moved. This prevents the biological fouling debris from being dragged along the hull and potentially causing additional damage to any antifouling coating applied thereon.

In some instances, the biological fouling can be hard and difficult to remove so that it does not necessarily separate from the submerged surface after a single pass of the cleaning head 10 in the operatively forward direction. In such case the scraper blade 44 will ride up and over the biological fouling causing the cleaning head 10 to move away from the submerged surface for short distances. The exemplary location of the handle 28, operatively forward of the scraper blade 44, results in the downward pressure toward the surface and forward forces applied by the operator being operatively in advance of the spacer blade 44. This assists in permitting the scraper blade 44 to ride up and over any non-removed biological fouling.

In contrast thereto, in some other systems wherein the downward force and forward forces are applied either substantially above or operatively rearward of their scraper blades, the scraper blades may tend to get stuck or embedded within the biological fouling and this often results in the scraper blade tending to buckle or pivot over the biological fouling—often causing damage to the blade so that it no longer operates correctly.

In operation of the exemplary arrangement as the biological fouling is separated from the submerged surface, together with any loosely attached leached layers of any antifouling coating that may separate from the hull or other surface during the scraping operation, the material becomes suspended entrained in the surrounding water causing a slurry of "dirty" water within, adjacent to and around the cleaning head 10. This slurry of fluid and suspended material is sucked through the channels 50 and into the mouth 14 into the body 12 for receipt and removal via the suction aperture 16 and suction pipe for further treatment and filtration before the cleaned water is returned to the environment.

In the exemplary arrangement the increased flow rate and velocity caused by the smaller openings of the channels 50 increases the suction region range from which the surrounding water is capable of being sucked into the cleaning head 10. This results in substantially all the removed biological fouling being captured by the cleaning head 10 without any of the biological fouling dispersing to the environment. Of course it should be understood that this cleaning head arrangement is exemplary and in other arrangements other configurations may be used.

FIGS. 5 to 8 show a further alternative arrangement of a cleaning head 110. The cleaning head 110 is configured to be used in an automated marine cleaning system, e.g. such as in the system described in the incorporated disclosure of U.S. Pat. No. 9,550,552 wherein the cleaning head 110 is configured to be rotatably mounted within the body of housing (140) thereof and moved along the submerged surface to be cleaned. The cleaning head 110 is configured to be disposed adjacent to and rotated in an operatively forward direction relative to the submerged surface during use. The operatively forward direction is indicated by arrow 112. In this exemplary arrangement the drive shaft functions as the maneuvering mounting being configured to allow a maneuvering force to be applied to the cleaning head 110.

It should be understood for the purposes of the description below referring to cleaning head 110 that the terms "forward" and "rearward" refer to operative direction of movement. Thus "forward" is used to refer to a feature or part of the cleaning head 110 that is rotationally in advance of another feature or part. Conversely, "rearward" is used to refer to a feature or part of the cleaning head 110 that rotationally follows another feature or part.

The exemplary cleaning head 110 comprises a disc shaped body 114. A plurality of suction apertures 116 extend transversely through the body 114, through which suction apertures 116 the suction from the suction pipe can be applied and through which the slurry of water and suspended biological fouling material can be removed during use.

The exemplary cleaning head 110 further comprises a number of cleaning members 118 arranged at discrete spaced circumferential intervals on the body 114. Each cleaning member 118 includes an attachment bracket/junction 120 configured to be fixed to the body 114, through fasteners such as by screws or bolts 122. A support arm 124 extends rotationally rearwardly from the bracket 120 with the support arm 124 carrying a cleaning element 126 depending from its opposed end and in fixed operative connection with the support arm, i.e. the bracket 120 is disposed in the operatively forward direction of the cleaning element 126 during use.

The exemplary support arm 124 is flexibly attached to the body 114 at a junction through the bracket 120 so that the support arm 124 is capable of flexing to allow movement of the cleaning element 126 transversely to the operatively forward direction closer to or further away from the body 114. A biasing member 128 is provided to bias the support arm 124 and cleaning element 126 away from the body 114. In the illustrated example, the biasing member 128 is provided to act between the body 114 and the support arm 124. The biasing member 128 may comprise a spring in some exemplary arrangements, such as a compression spring. In alternative exemplary arrangements the biasing member may comprise a pillar of resilient plastics or foam material, for example.

Figure 8:
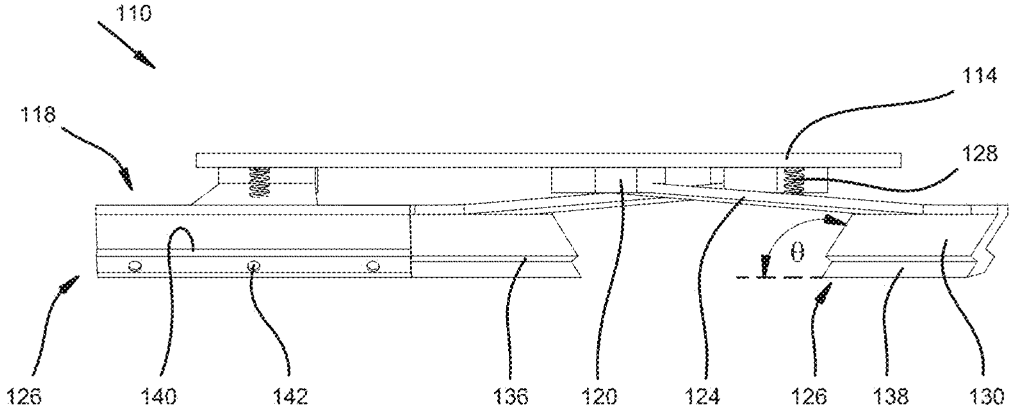
FIG. 8 is a side view of the cleaning head shown in FIG. 5.

In the exemplary arrangement each cleaning element 126 is angled forwardly/inwardly towards the bracket 120 so that, during use, the exemplary cleaning element 126 will be operatively aligned relative to the submerged surface at an angle θ of 130°-140° (see FIG. 8). In some exemplary arrangements the angle θ is 135°.

In this exemplary arrangement the cleaning element 126 comprises a scraper body 130 having an outer face 132 facing away from the bracket 120, an inner face 134 facing towards the bracket 120, and a lower edge 136. The exemplary scraper body 130 is integral with the support arm 124, and may be substantially wider than the support arm as shown.

The exemplary scraper body 130 supports a scraper blade 138 in operatively fixed engagement therewith extending along and beyond its lower edge 136. In this exemplary arrangement the scraper blade 138 lies outwardly of the scraper body 130 so that a top edge of the scraper blade 138 defines a ridge 140 extending along the outer face 132. The exemplary ridge 140 acts as a strengthening formation to strengthen the scraper body 130 and mitigate any flexing thereof that may occur during use.

In this exemplary arrangement the scraper body 130 and the scraper blade 138 have a flat planar shape when seen in plan view. Further, the exemplary scraper blade 138 is releasably fixed to the scraper body 130 by bolts 142. Of course it should be understood that this configuration is exemplary and in other arrangements other configurations may be used.

In use of this exemplary cleaning head 110, when the scraper blade 138 encounters hard to remove biological fouling, the scraper blade 138 moves relative to the body transversely of the operatively forward direction and will ride up and over the biological fouling. This movement is permitted through flexing of the support arm 124 and correlated compression of the biasing member 128. Once the obstacle is traversed, the biasing member 128 urges the scraper blade 138 back into engaging contact with the submerged surface.

The location of the connection location of bracket 120 operatively forward of the scraper blade 138 in the exemplary arrangement, results in the downward and lateral forces applied by the body 114 being operatively in advance of the scraper blade 138. This assists in allowing the scraper blade 138 to ride up and over any non-removed biological fouling, which mitigates any tendency of the scraper blade

138 buckling or pivoting over the biological fouling and thereby reducing the likelihood of damage to the scraper blade 138.

It will be appreciated by persons skilled in the art that numerous variations and/or modifications may be made to the cleaning head arrangements as shown herein without departing from the spirit or scope of the disclosure as broadly described. The disclosed arrangements are, therefore, to be considered in all respects as illustrative and not restrictive.

In the claims which follow and in the preceding description, except where the context requires otherwise due to express language or necessary implication, the word "comprise" or variations such as "comprises" or "comprising" is used in a non-limiting and an inclusive sense, i.e. to specify the presence of the stated features but not to preclude the presence or addition of further features in the recited arrangements. A reference to an element by the article "a" includes an arrangement in which more than one of the elements is present, unless the recited arrangement specifically requires that there be one and only one of the elements.

Thus the exemplary arrangements achieve improved operation, eliminate difficulties encountered in the use of prior devices, methods and systems and attain the useful results described herein.

In the foregoing description, certain terms have been used for brevity, clarity and understanding. However, no unnecessary limitations are to be implied therefrom because such terms are used for descriptive purposes and are intended to be broadly construed. Moreover the descriptions and illustrations herein are by way of examples and the new and useful features and relationships are not limited to the exact features and relationships shown and described.

It should be understood that the features and/or relationships associated with one exemplary arrangement can be combined with features and/or relationships from another exemplary arrangement. That is, various features and/or relationships from various exemplary arrangements can be combined in further arrangements. The new and useful aspects of the disclosure are not limited to only the exemplary arrangements shown and/or described herein.

Having described the features, discoveries and principles of the exemplary arrangements, the manner in which they are constructed and operated, and the advantages and useful results attained, the new and useful features, devices, elements, arrangements, parts, combinations, systems, equipment, operations, methods, processes and relationships are set forth in the appended claims.

| Reference numerals | |
|---|---|
| 10 | cleaning head |
| 12 | body |
| 13 | interior area |
| 14 | mouth |
| 15 | body end |
| 16 | suction aperture |
| 17 | body end |
| 18 | arrow (operative direction) |
| 20 | roof |
| 22 | floor |
| 23 | magnets |
| 24 | side walls |
| 26 | central axis |
| 28 | handle |
| 30 | support arm |
| 32 | junction |
| 34 | cleaning element |
| 35 | submerged surface |
| 36 | scraper body |
| 38 | outer face |
| 40 | inner face |
| 42 | lower edge |
| 44 | scraper blade |
| 46 | ridge |
| 48 | wings |
| 50 | channels |
| 110 | cleaning head |
| 112 | arrow (operative direction) |
| 114 | body |
| 116 | suction apertures |
| 118 | cleaning members |
| 120 | junction/bracket |
| 122 | bolts |
| 124 | support arm |
| 126 | cleaning element |
| 128 | biasing member |
| 130 | scraper body |
| 132 | outer face |
| 134 | inner face |
| 136 | lower edge |
| 138 | scraper blade |
| 140 | ridge |
| 142 | bolts |
| α | larger transverse dimension of body |
| β | smaller transverse dimension of body |
| θ | inclination angle of cleaning element |
| Φ | cross section dimension of channel |

The invention claimed is:

1. Apparatus comprising:

a cleaning head configured for use with a marine cleaning system that is usable to clean a liquid submerged surface, wherein the cleaning head includes a body, wherein the body is configured to be movable in disposed adjacent relation relative to the submerged surface, at least one suction aperture, wherein during use the at least one suction aperture is in fluid communication with a suction region adjacent the body, at least one support arm, wherein each support arm is operatively connected to the body at a respective junction, extends from the respective junction, at least one cleaning element, wherein each cleaning element is in fixed operative connection with a respective support arm, is spaced away from the respective junction of the respective support arm such that the junction is disposed in an operatively forward direction of the cleaning element, is angled toward the respective junction of the respective support arm with which the cleaning element is in fixed operative connection such that during use of the cleaning head each respective cleaning element extends at a preselected operative cleaning inclination angle relative to the submerged surface, is configured to engage the submerged surface and to cause material on the submerged surface to separate from the submerged surface and become suspended in the suction region responsive to body movement adjacent and in the operatively forward direction relative to the submerged surface, wherein material separated from the submerged surface is enabled to be drawn away from the suction region and through the at least one suction aperture.

2. The apparatus according to claim 1
wherein the body is substantially tubular,
wherein the at least one suction aperture comprises one suction aperture positioned at a first end of the body, and
wherein the body further includes an open mouth at a second end of the body opposed of the first end.

3. The apparatus according to claim 1
wherein the body is substantially tubular and bounds a body interior area,
wherein the at least one suction aperture comprises one suction aperture positioned at a first end of the body interior area, and
wherein the body further includes an open mouth at a second end of the body interior area opposed of the first end,
wherein the mouth has a greater cross sectional area than the one suction aperture such that the body interior area is convergent from the second end toward the first end.

4. The apparatus according to claim 1
wherein the body further includes a floor,
wherein the floor is inclined relative to the at least one cleaning element,
wherein with the body in an orientation with the floor substantially parallel to the submerged surface, the at least one cleaning element extends at the preselected operative cleaning inclination angle relative to the submerged surface.

5. The apparatus according to claim 1
wherein the body further includes
a floor, and
at least one magnet in operatively fixed connection with the floor,
wherein the floor is inclined relative to the at least one cleaning element,
wherein with the body in an orientation with the floor substantially parallel to the submerged surface,
the at least one cleaning element extends at the preselected operative cleaning inclination angle relative to the submerged surface, and
attraction of the least one magnet to ferromagnetic material in the submerged surface is operative to hold the body in the orientation and in slidable engagement with the submerged surface.

6. The apparatus according to claim 1
wherein each at least one cleaning element comprises
a scraper body, and
a scraper blade,
wherein the scraper blade is either
an integral part of the scraper body, or
a separable part that is releasably joined to the scraper body.

7. The apparatus according to claim 1
wherein each cleaning element has a flat planar shape.

8. The apparatus according to claim 1
wherein each cleaning element has an arcuate shape including a concave inner face,
wherein the concave inner face is directed toward the body.

9. The apparatus according to claim 1
wherein each cleaning element
has an arcuate shape including a concave inner face,
wherein the concave inner face is directed toward the body,
includes a central part that is disposed in intermediate relation of a pair of laterally opposed outer parts,
is arch shaped such that a central part of the cleaning element is raised above the opposed outer parts of the cleaning element.

10. The apparatus according to claim 1
wherein each cleaning element has a cleaning element transverse width that is substantially wider than a transverse width at the respective junction of the respective support arm to which the cleaning element is operatively attached,
wherein the cleaning element includes a pair of laterally opposed outer portions, wherein each respective outer portion extends transversely beyond the respective support arm on each respective transverse side of the cleaning element.

11. The apparatus according to claim 1
wherein the cleaning head further includes
opposed channels, wherein the opposed channels extend
on opposed transverse sides of the body, and
intermediate along the operatively forward direction of a respective cleaning element and the body,
wherein each channel is configured to enable liquid flow from the suction region toward the at least one suction aperture.

12. The apparatus according to claim 1
wherein the cleaning head further includes
opposed channels, wherein the opposed channels extend
on opposed transverse sides of the body, and
intermediate along the operatively forward direction of a respective cleaning element and the body,
wherein each channel
is configured to enable liquid flow from the suction region toward the at least one suction aperture, and
includes a venturi type constriction operative to cause an increased flow rate of liquid from the suction region into the at least one suction aperture.

13. The apparatus according to claim 1
wherein the cleaning head further includes
opposed channels, wherein the opposed channels extend
on opposed transverse sides of the body, and
intermediate along the operatively forward direction of a respective cleaning element and the body,
wherein each channel is configured to enable liquid flow from the suction region toward the at least one suction aperture,
wherein each cleaning element is selectively variably positionable in fixed operative connection with the body, such that a respective cross sectional area of each channel is selectively variable.

14. The apparatus according to claim 1
wherein the body includes a rotatable disc, and
the at least one suction aperture comprises at least one opening through the disc.

15. The apparatus according to claim 1
wherein the body includes a rotatable disc, and
the at least one suction aperture comprises at least one opening through the disc, and
wherein the at least one cleaning element comprises a plurality of cleaning elements arranged at spaced circumferential intervals relative to the rotatable disc.

16. The apparatus according to claim 1
wherein each respective support arm is in flexibly attached operative connection with the body, wherein each cleaning element is enabled responsive to the flexibly attached connection of the respective support arm to be movable in a direction transverse to the operatively forward direction to be closer to and further from the body.

17. The apparatus according to claim 1 wherein each respective support arm is in flexibly attached operative connection with the body, wherein each cleaning element is enabled responsive to the flexibly attached connection of the respective support arm to be movable in a direction transverse of the operatively forward direction to be closer to and further from the body, and further including at least one biasing member, wherein the at least one biasing member is configured to bias a respective cleaning element and support arm away from the body.

18. The apparatus according to claim 1 wherein the inclination angle is 130° to 140°.

19. The apparatus according to claim 1 wherein the cleaning head further includes at least one manually engageable handle in operative connection with the body, wherein the at least one manually engageable handle extends perpendicular to the operatively forward direction.

20. Apparatus comprising:

a cleaning head configured for use with a marine cleaning system that is usable to remove material from a submerged surface surrounded by liquid, wherein the cleaning head includes:

a body, wherein the body includes at least one suction aperture, wherein the at least one suction aperture is configured to receive liquid and material suspended in the liquid, at least one support arm, wherein each support arm is flexibly operatively connected with the body at a respective connection location, at least one scraper blade, wherein each scraper blade is disposed a distance away from the body, and is in fixed operative connection with a respective support arm in a position spaced away from the respective support arm connection location, wherein the flexible connection of the support arm causes a distance of the respective scraper blade away from the body to be variable, wherein the connection location is disposed from the scraper blade in an operatively forward direction in which the scraper blade is moved in engagement with the submerged surface to cause material on the submerged surface to be removed and suspended in the liquid adjacent to the body, wherein suspended material separated from the submerged surface is enabled to be received in the at least one suction aperture.

21. The apparatus according to claim 20 wherein the body is configured such that the scraper blade when engaged with the submerged surface extends at an inclination angle, wherein the inclination angle is from 130° to 140°.

22. The apparatus according to claim 21 wherein the at least one scraper blade comprises either a planar blade that extends transverse to the operatively forward direction, or an arcuate blade with outer wings at opposed lateral ends of the blade that extend toward the body, and wherein the variable distance is in a direction transverse to the operatively forward direction.

23. The apparatus according to claim 22 wherein the cleaning head further includes at least one cleaning element, wherein each cleaning element is in operatively fixed connection with a respective support arm, has the respective connection location of the respective support arm disposed in the operatively forward direction from the respective cleaning element, and has a respective scraper blade in operatively fixed connection with the respective cleaning element.

24. The apparatus according to claim 23 wherein the body comprises at least one or more of a tubular body, wherein the body bounds an interior area, wherein the at least one suction aperture is operative to remove liquid and suspended material from the interior area of the body, includes a mouth, wherein the mouth is open to the interior area of the body, and is disposed in the first operative direction from the scraper blade, whereby liquid and suspended material is enabled to enter the interior area of the body through the mouth, or a rotatable disc, wherein the at least one support arm and at least one cleaning element include a plurality of support arms each with a respective cleaning element arranged at spaced circumferential intervals on the rotatable disc, wherein the at least one suction aperture comprises at least one opening that extends through the disc.

25. A method comprising:

a) engaging a cleaning head with a submerged surface, wherein the submerged surface is surrounded by liquid, wherein the cleaning head includes a body, wherein the body includes at least one suction aperture, wherein the at least one suction aperture is configured to receive liquid and material suspended in the liquid, at least one support arm, wherein each support arm is flexibly operatively connected with the body at a respective connection location, at least one scraper blade, wherein each scraper blade is disposed a distance away from the body, and is in fixed operative connection with a respective support arm in a position spaced away from the respective support arm connection location, wherein the flexible connection of the support arm causes the distance of the respective scraper blade away from the body to be variable, wherein the connection location of the respective support arm is disposed from the respective scraper blade in an operatively forward direction, b) moving the body in the operatively forward direction with the at least one scraper blade in engagement with the submerged surface, wherein material is separated from the submerged surface and suspended in the liquid adjacent to the body, c) receiving liquid and the suspended material through the at least one suction aperture.

26. The method according to claim 25 wherein in (b) the blade extends relative to the submerged surface at an inclination angle of from 130° to 140°.

27. The method according to claim 26
wherein in (a) the at least one scraper blade comprises either
a planar blade that extends transverse to the operatively forward direction, or
an arcuate blade with outer wings at opposed lateral ends of the blade that extend toward the body, and
wherein the variable distance is in a direction transverse of the operatively forward direction.

28. The method according to claim 27
wherein in (a) the cleaning head further includes
at least one cleaning element, wherein each cleaning element
is in operatively fixed connection with the respective support arm, and
has the respective connection location of the respective support arm disposed in the operatively forward direction from the respective cleaning element, and
has a respective scraper blade in operatively fixed connection with the respective cleaning element,
wherein in (b) the distance from the body of each scraper blade varies.

29. The method according to claim 28
wherein in (a) each suction aperture is disposed in the operatively forward direction from a respective scraper blade, wherein in (b) the suspended material is suspended in the liquid intermediate of a respective scraper blade and a respective suction aperture.

30. The method according to claim 29
wherein in (a) the body comprises one or more of
a tubular body, wherein the body
bounds an interior area, wherein the at least one suction aperture is in fluid connection with the interior area of the body,
includes a mouth, wherein the mouth
is open to the interior area of the body, and
is disposed in the operatively forward direction from a respective scraper blade,
or
a rotatable disc,
wherein the at least one support arm and at least one cleaning element include a plurality of support arms each with a respective cleaning element arranged at spaced circumferential intervals on the support disc, and
wherein the at least one suction aperture comprises at least one opening that extends through the support disc,
wherein in (c) liquid and suspended material is received in the at least one suction aperture either
from the interior area of the tubular body, or
through the at least one opening in the rotatable disc.

* * * * *